Dec. 4, 1951   M. BAINBRIDGE ET AL   2,576,992
HARVESTING MACHINE
Filed Aug. 13, 1946   12 Sheets-Sheet 2

INVENTORS
Marvin Bainbridge, William P. Tuttle
Henry J. Baldwin, Eugene S. Sheffield, Jr.
BY Ritter, Machlin + Nuss
their attorneys Dec. 4, 1951 — M. BAINBRIDGE ET AL — 2,576,992
HARVESTING MACHINE
Filed Aug. 13, 1946 — 12 Sheets-Sheet 4

INVENTORS
Marvin Bainbridge, William P. Tuttle,
Henry J. Baldwin, Eugene S. Sheffield, Jr.
BY Ritter, Mechlin & Muir
their attorneys

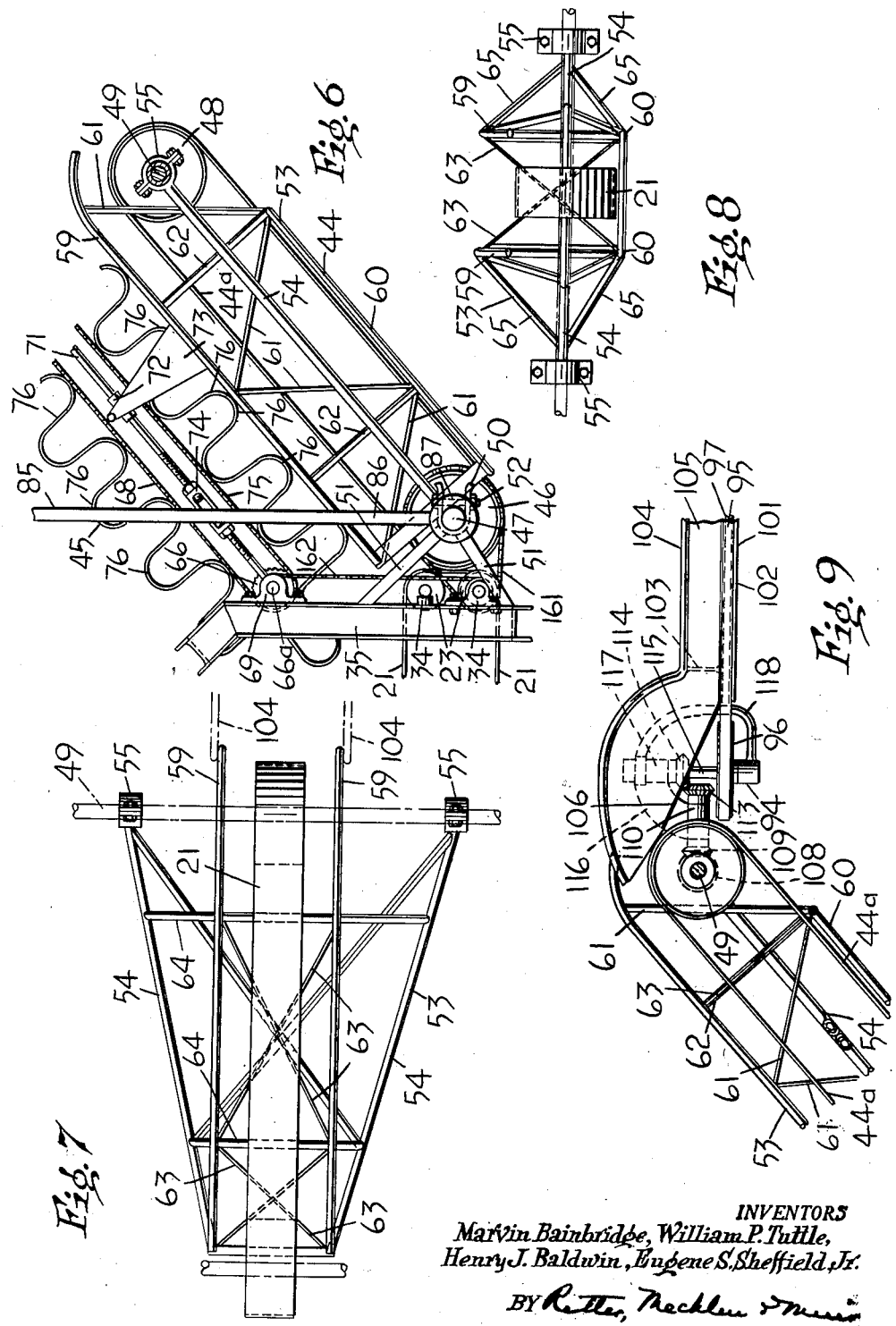

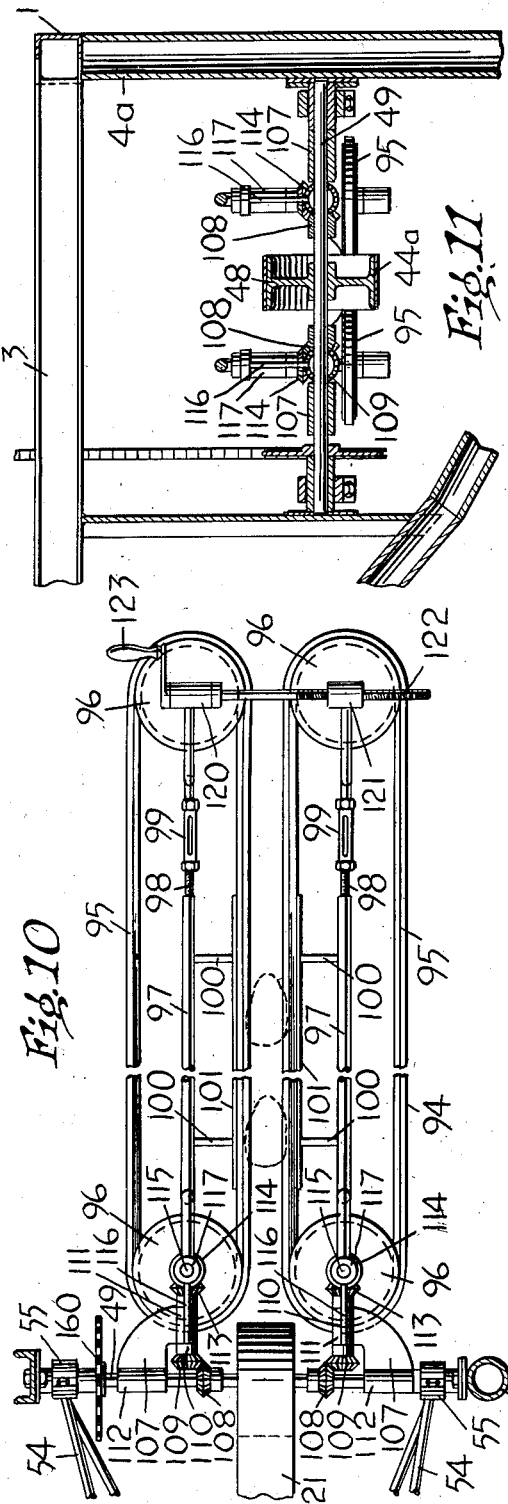

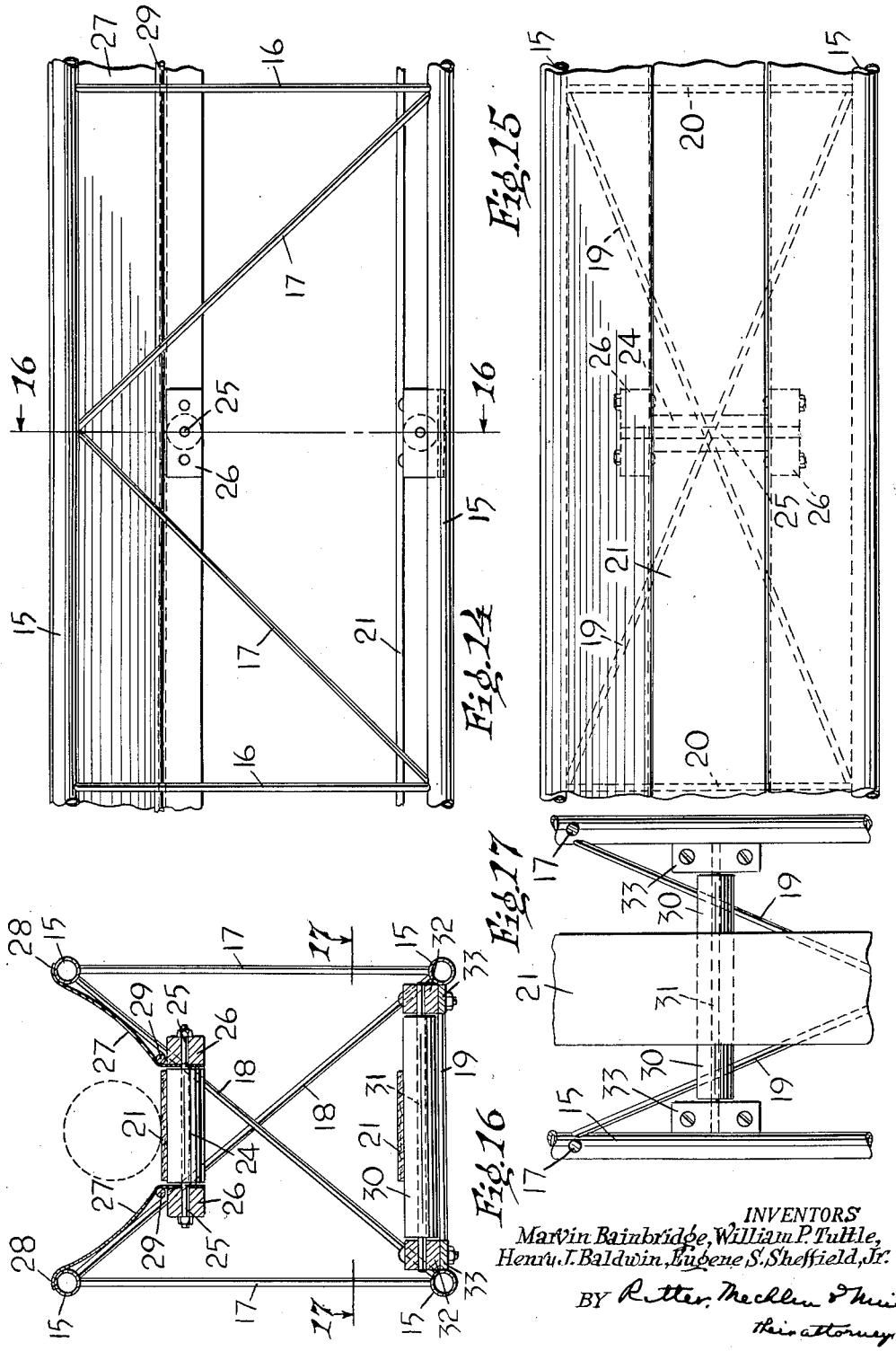

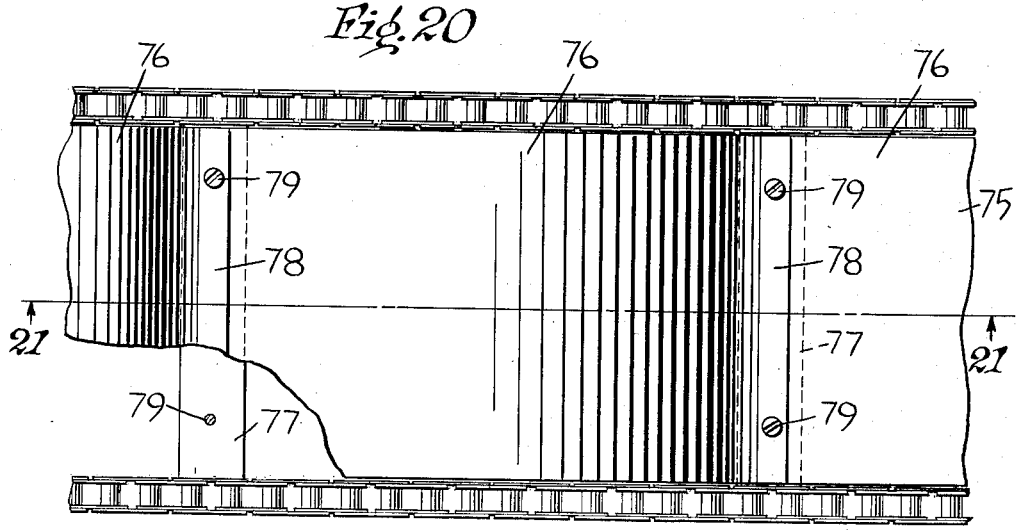
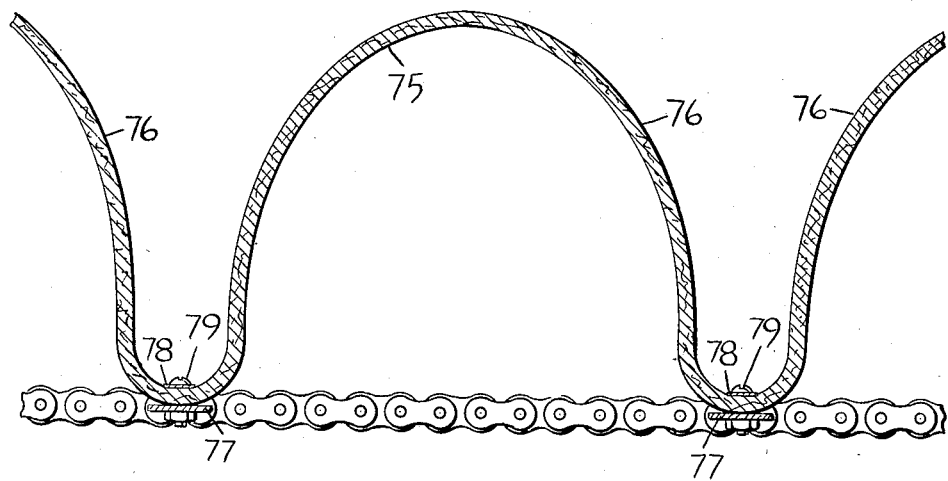

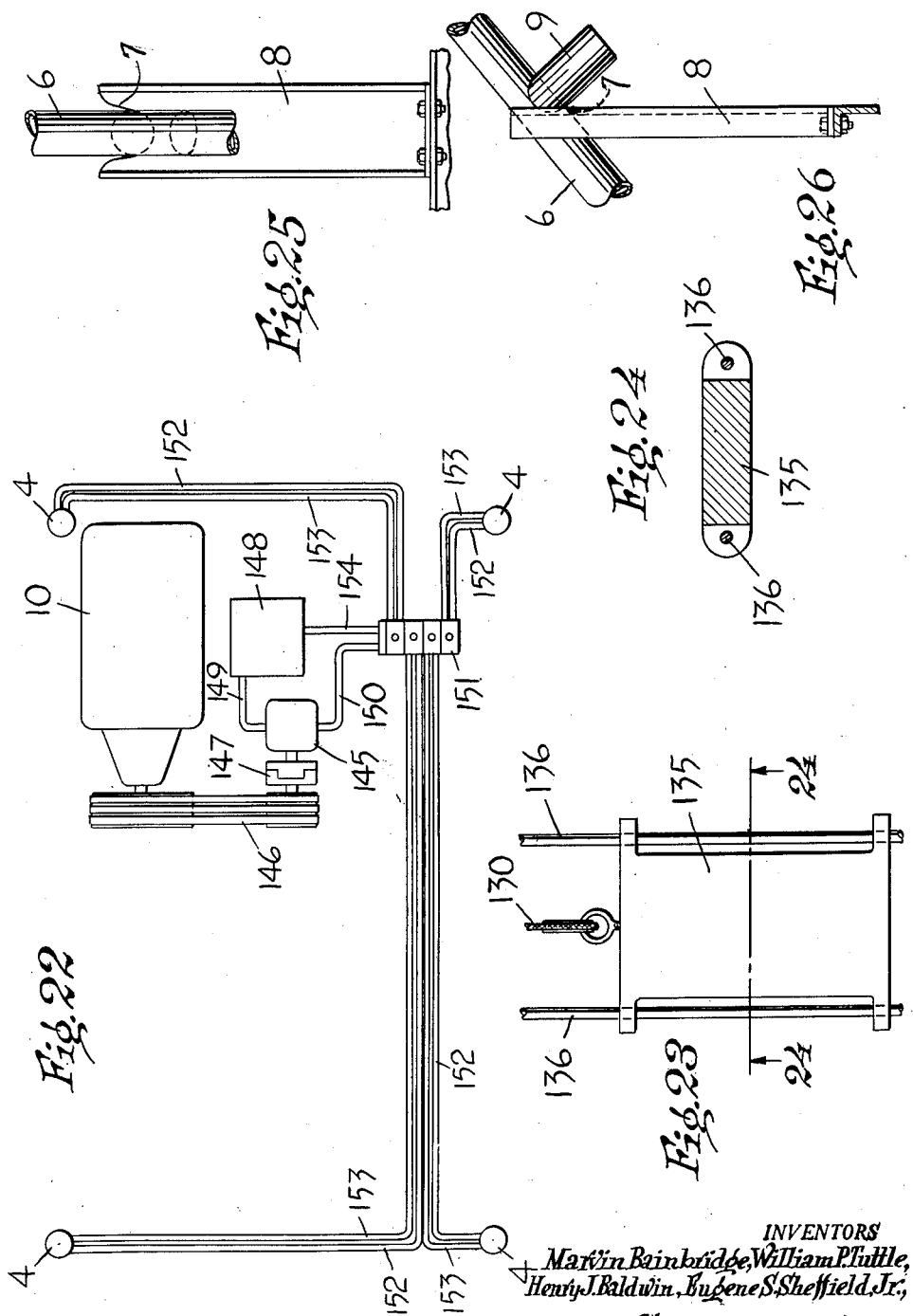

Dec. 4, 1951 — M. BAINBRIDGE ET AL — 2,576,992
HARVESTING MACHINE
Filed Aug. 13, 1946 — 12 Sheets-Sheet 10

Inventor
Marvin Bainbridge, William P. Tuttle,
Henry J. Baldwin, Eugene S. Sheffield Jr.

Attorneys

Dec. 4, 1951 M. BAINBRIDGE ET AL 2,576,992
HARVESTING MACHINE
Filed Aug. 13, 1946 12 Sheets-Sheet 11

Inventor
Marvin Bambridge, William P. Tuttle,
Henry J. Baldwin, Eugene S. Sheffield Jr.

By Ritter, Mechlin & Muir
Attorneys

Dec. 4, 1951  M. BAINBRIDGE ET AL  2,576,992
HARVESTING MACHINE
Filed Aug. 13, 1946  12 Sheets-Sheet 12
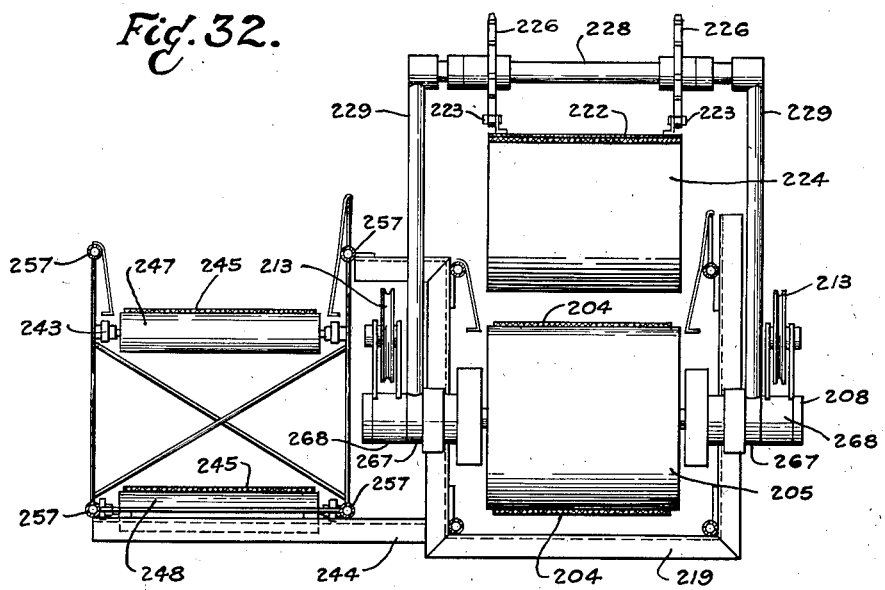
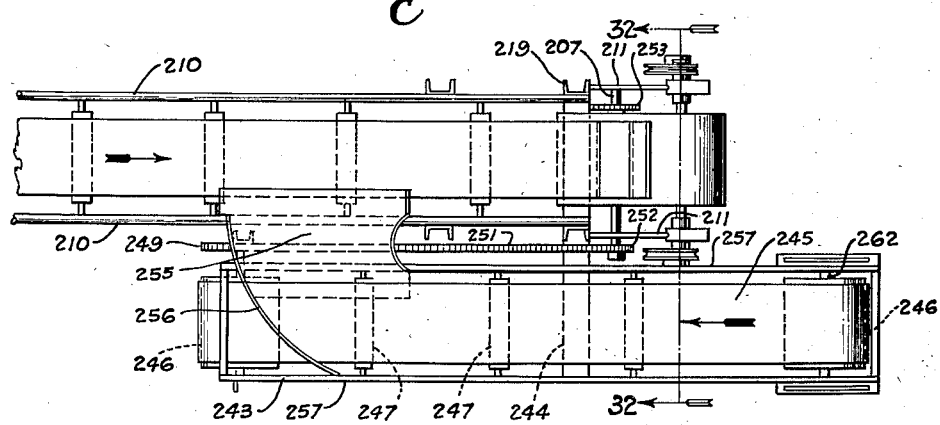
Inventor
Marvin Bainbridge, William P. Tuttle,
Henry J. Baldwin, Eugene S. Sheffield, Jr.
By Ritter, Mechlin & Muir
Attorneys

Patented Dec. 4, 1951

2,576,992

UNITED STATES PATENT OFFICE 2,576,992

HARVESTING MACHINE

Marvin Bainbridge, Kahului, and William P. Tuttle and Henry J. Baldwin, Paia, and Eugene S. Sheffield, Jr., Kahului, Territory of Hawaii, assignors to Maui Pineapple Company, Ltd., Paia, Territory of Hawaii, a corporation of the Territory of Hawaii Application August 13, 1946, Serial No. 690,170

5 Claims. (Cl. 214—83)

My invention relates to a method and apparatus for harvesting pineapples and other crops and its principal object is to provide a simple method and apparatus for conveying pineapples from the field being harvested to a point of delivery for loading into receptacles.

Pineapples must be ripened on the plants on which they grow and picked at full maturity. In this condition, they are easily bruisable and consequently they must be carefully handled. For this reason, as explained in the copending application of Bernard J. Butler, Serial No. 521,372, filed February 7, 1944, Patent No. 2,406,992, it has been the previous universal practice to place the picked pineapples in boxes in the field and then load the filled boxes onto vehicles to transport them from the field to the cannery or processing plants where the boxes are manually unloaded from the trucks and emptied of their contents. Quite apart from the waste of time and other difficulties encountered in employing boxes in which pineapples are loaded and then subsequently unloaded, repeated handling of the ripened fruit frequently injures it and should be avoided for best results.

The general object of the invention is to provide a simple method and apparatus for mechanically conveying the pineapples from the field where they are severed from their plants and loading them in bulk in a vehicle for transportation to the cannery.

Another object of the invention is to provide a harvesting machine which may be easily carried by and detached from a mobile truck having a body in which the pineapples are to be loaded.

A further object of the invention is to provide improved means for raising the pineapples without bruising to an elevation from which they may be easily discharged into the truck body.

A primary feature of the invention consists in providing a method of harvesting pineapples by placing the pineapples upon a conveying apparatus which is supported adjacent the roadway bordering the field being harvested and extends out over the field and elevating the pineapples so that they may be discharged downwardly into the lading receiving space of a vehicle.

Another feature of the invention consists in providing a harvesting machine with a conveyer which is adapted to extend over the field to be harvested on which pineapples are placed and in positioning elevating means at the discharge end of the conveyer for raising the pineapples delivered thereto without bruising them.

Another feature of the invention consists in providing a harvesting machine with a conveyer which is adapted to extend over the field to be harvested and on which pineapples are placed and in positioning at the side of the conveyer an auxiliary conveyer extending beyond the discharge end of the main conveyer, the two conveyers being movable in opposite directions and the auxiliary conveyer being provided with means for deflecting fruit placed thereon onto the main conveyer.

Still another feature of the invention consists in providing the elevating means of the harvesting machine with a pair of endless members arranged in lapping substantially parallel relation, one of which has laterally projecting portions respectively adapted to apply slight pressure to the upper sides of the pineapples to hold them, without rolling, against the lower endless member to thereby propel them to a higher level.

A further feature of the invention consists in providing the elevating means of the harvesting conveyer with a pair of endless conveyers arranged in lapping substantially parallel relation, one of the endless members having a substantially horizontal reach overlapping the discharge end of the main conveyer for engaging fruit thereon and transferring it to the other of said endless members and to apply the pressure to the fruit to hold it against the last named endless member so that the fruit will be elevated to a higher level.

A further feature of the invention consists in providing the harvesting machine with a distributing conveyer having adjustable means for varying the point of discharge of the pineapples therefrom transversely of the lading carrying space of the vehicle.

A still further feature of the invention consists in providing the harvesting machine with a distributing conveyer which is adapted to be disposed over the body of a mobile truck and which is provided with a pair of endless conveyer belts whose adjacent reaches jointly afford a traveling support for the pineapples delivered thereto.

A still further feature of the invention consists in providing the harvesting machine with a frame adapted to rest on and straddle the body of a mobile truck, the frame having means engageable with the ground whereby it may be raised from the truck body and be supported on the ground to enable a loaded truck to be moved from beneath the machine and an unloaded one to be substituted therefor.

Other and more specific features of the invention, residing in advantageous forms, combinations and relations of parts, will hereinafter appear and be pointed out in the claims.

In the drawings,

Figure 6 is an enlarged fragmentary sectional view of the lower portions of the elevating and flight conveyers, together with adjacent portions of the main conveyer.

Figure 7 is a plan view of the elevating conveyer and frame.

Figure 8 is an end view of the elevating conveyer, as viewed from the upper end thereof, in the plane of the conveyer belt.

Figure 9 is an enlarged fragmentary sectional view of the upper ends of the elevating and flight conveyers together with adjacent portions of the distributing conveyer.

Figure 10 is a plan view of the distributing conveyer and adjacent portions of parts of the elevating conveyer, the side walls of the distributing conveyer and the floor which is adjacent the receiving end thereof being omitted for clarity.

Figure 11 is a sectional view taken on line 11—11 of Figure 3.

Figure 12 is an enlarged transverse sectional view of the distributing conveyer taken on line 12—12 of Figure 3.

Figure 13 is an end view of the distributing conveyer showing the adjustable means for varying the space between the two endless belts thereof.

Figure 14 is an enlarged fragmentary side elevational view of the main conveyer.

Figure 15 is a plan view of the construction illustrated in Figure 14.

Figure 16 is a sectional view taken on line 16—16 of Figure 14.

Figure 17 is a sectional view taken on line 17—17 of Figure 16.

Figure 18 is a front view of the supporting yoke which is located at the rear or inner end of the main conveyer.

Figure 19 is a side elevational view of the yoke shown in Figure 18.

Figure 20 is an enlarged fragmentary plan view of the flight conveyer.

Figure 21 is a sectional view taken on line 21—21 of the upper reach of the flight conveyer.

Figure 22 is a diagram of the hydraulic system for controlling actuation of the ground engaging members or pistons of the machine.

Figure 23 is a front elevational view of the counterweight for maintaining lateral stability of the machine showing the guide rods on which it is movable, together with adjacent portions of the flexible supporting cables.

Figure 24 is a sectional view taken on line 24—24 of Figure 23.

Figures 25 and 26 are front and sectional views respectively of the machine carrying brackets, together with adjacent portions of the truck body.

Figure 27 is a plan view of the outer end of the conveyer on which the pineapples are placed, showing the adjusting means for the endless belt.

Figure 28 is an elevational view of the construction shown in Figure 27.

Figure 31 is a plan view of the discharge end of the main conveyer and of an auxiliary conveyer.

Figure 32 is an enlarged sectional view taken on line 32—32 of Figure 31.

Figure 1:
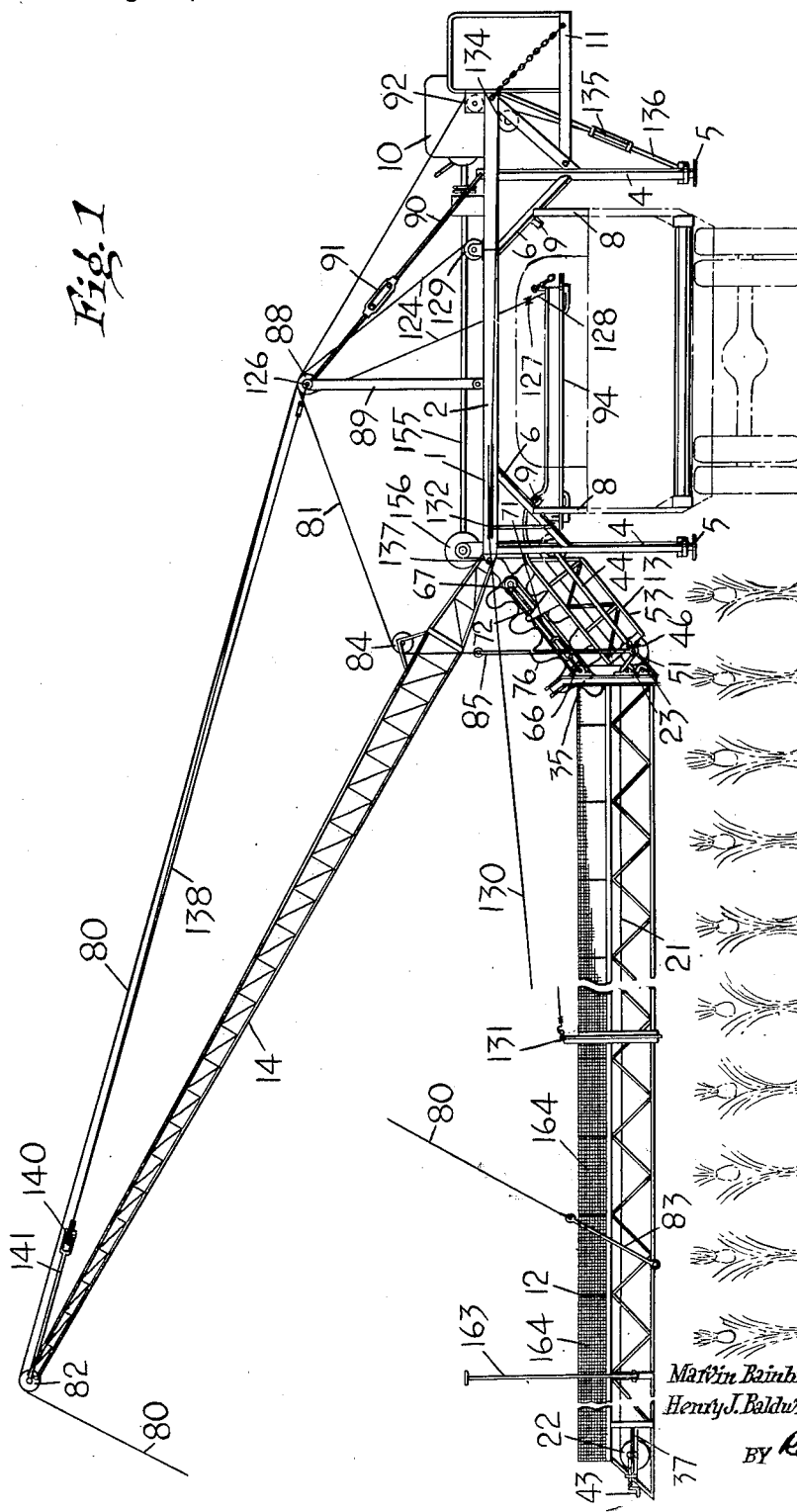
Figure 1 is a side elevational view of the harvesting machine showing it mounted upon a mobile truck which is illustrated in dot and dash lines.
Figure 2:
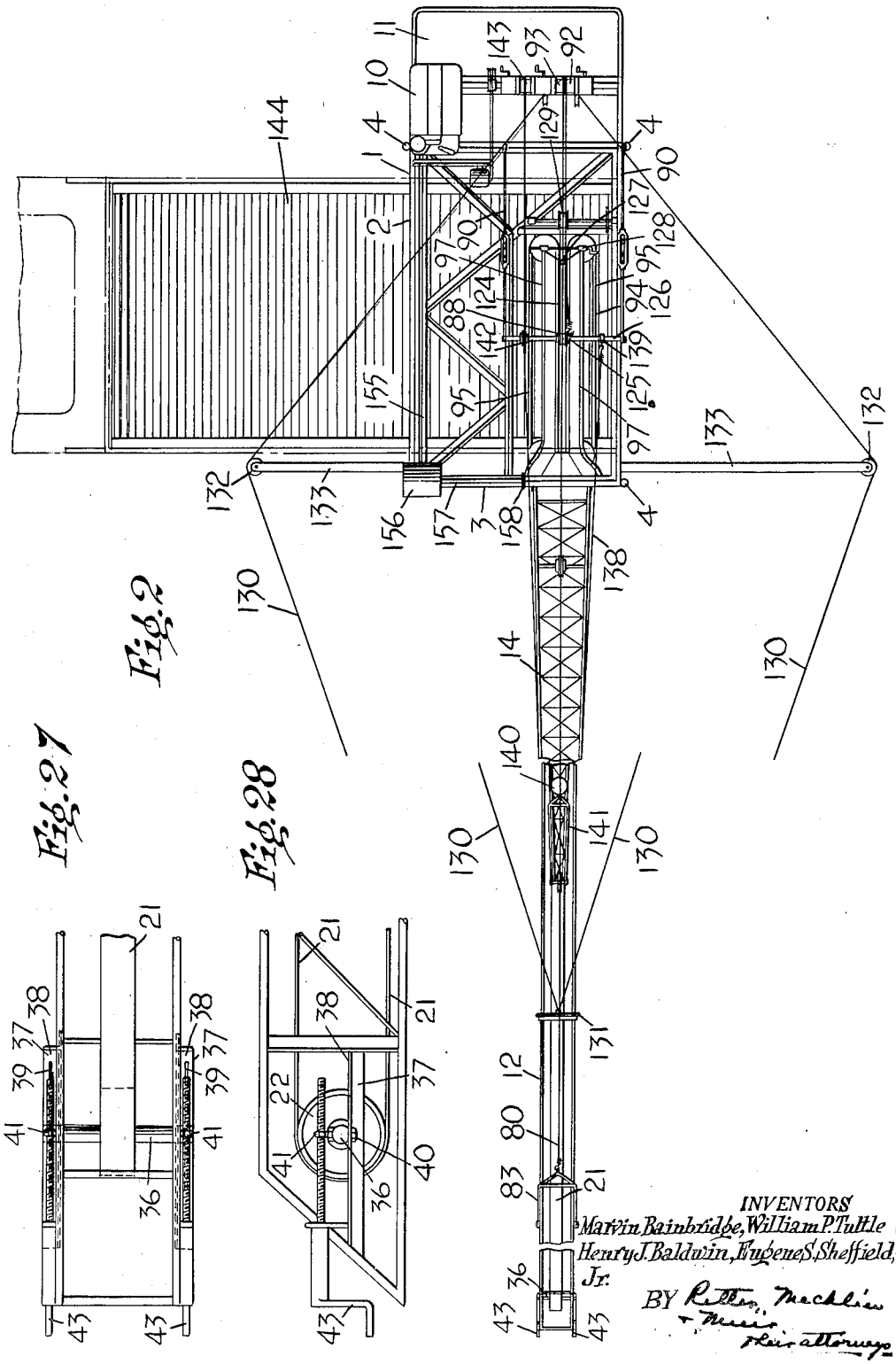
Figure 2 is a plan view of the construction illustrated in Figure 1, the mobile truck being shown in dot and dash lines.

Referring more particularly to the drawings, I indicates the frame of the machine which is adapted to overlie a receptacle to be loaded, such as the body of a mobile truck. The frame may be conveniently of rectangular shape having side members or beams 2 connected by transverse members or beams 3. Depending from the frame at the corners thereof are double acting cylinders 4 respectively having pistons 5 which upon being actuated are adapted to engage the ground to move the machine upwardly and support it in an elevated position. Intervening between the cylinders which are adapted to be disposed on the same side of the truck body are side portions of the frame which have upright members 4a to which the cylinders 4 may be conveniently secured, as by welding.

The uprights 4a are made rigid with the frame I by diagonal members 6 which are adapted to be positioned within recesses 7 formed in the upper ends of brackets 8 rigidly connected to the body of a truck, shown in dot and dash lines in the principal figures of the drawings. The diagonals 6 are respectively provided with downwardly extending offset portions 9 which cooperate with the opposite sides of the brackets to prevent them from bending inwardly under the weight of the machine and to also limit downward movement of the machine with respect to the truck body.

Mounted on the frame adjacent one end thereof is an engine 10, preferably of the internal combustion type, affording power to operate suitable means, to be hereinafter described, for forcing the pistons 5 downwardly into engagement with the ground to raise the machine upwardly and support it in an elevated position above the mobile truck and for thereafter retracting the pistons so that the machine may be lowered onto and be supported by another truck which has been moved into proper position beneath the machine to be loaded with pineapples. A suitable platform or balcony 11 may be conveniently carried by the frame adjacent the engine 10 to support an operator in a position whereby the operation of the engine and the machine may be easily controlled.

Extending from the frame opposite the side on which the motor is located is a main conveyer 12, elevating means 13 and overhanging supporting boom 14. The main conveyer is adapted to extend over the field being harvested and the pineapples taken from the field are placed thereon. Since pineapple plantations are customarily laid out with parallel roadways at every hundred feet to permit spraying of the plants, the main conveyer preferably extends to a point substantially midway between the roadways. It is positioned comparatively close to the ground so that pineapples may be easily placed thereon by workers in the field, being supported, as hereinafter described, by the boom 14.

To make it as light as possible, the conveyer is provided with a skeleton frame comprising longitudinally extending members 15 which may advantageously be in the form of pipes. The pipes at each side of the conveyer may be conveniently connected together by substantially upright rods 16 and struts or diagonals 17. These side frames of the conveyer may be connected by rods 18 which extend diagonally from adjacent the upper ends of the rods 16 of one frame to the lower ends of rods 16 of the other frame. In addition, the pipes 15 at the lower sides of the side frame members are preferably connected by diagonal rods 19, as well as by rods 20 which extend substantially normal to the planes of the side frames adjacent the ends of the diagonals 19.

An endless conveying belt 21 of the main conveyer passes around an adjustable roller or pulley 22 adjacent the outer end of the conveyer structure and around a pair of vertically spaced pulleys 23 adjacent the inner end of the conveyer structure. At intermediate points, the upper reach of the conveying belt is supported by rollers 24 which are preferably revolubly mounted on shafts 25 carried in bearings 26 secured to the lower ends of inclined side walls 27. These side walls, which may conveniently be of any relatively thin and durable material, are connected to the upper members 15 of the conveyer side frames, as indicated at 28, and at their lower portions they pass over and depend below rods 29 which extend longitudinally of the conveyer and are welded or otherwise secured to the upper portions of the diagonal members 18 thereof. As the bearings for the rollers supporting the upper reach of the conveyer are secured to the portions of the side walls which extend below the rods 29, the side walls are maintained in the downwardly converging relation illustrated in Figure 14 so that pineapples placed on the conveyer will engage one or the other of the side walls and be thereby deflected onto the upper reach of the conveyer belt.

The lower reach of the endless belt also is preferably supported intermediate its ends on rollers 30 which may be revolubly mounted on shafts 31 carried in bearings 32 supported by and connected to plates or the like 33 welded or otherwise secured to the members 15 at the lower ends of the conveyer side frames. The pulleys 23 at the inner end of the conveyer belt are arranged in vertically spaced relation and are preferably mounted in bearings 34 carried by an upstanding bracket member 35 rigid with the frame of the main conveyer. The adjustable pulley 22 at the outer end of the conveyer is carried on a shaft 36 whose opposite ends slidably rest upon angle members 37. The top or horizontal legs 38 of the angle members are formed with elongated slots 39 for receiving the lower ends of upright bolts which pass through the adjacent ends of the shaft, the bolts being prevented from moving upwardly out of engagement with the slots by nuts 40. Welded or otherwise secured to the heads of those bolts are additional nuts 41 for receiving screw threaded members 42 which at their opposite ends are provided with cranks or the like 43 so that they may be easily actuated for moving the shaft 36 in a direction which will impart the desired tension to the endless belt.

The elevating means 13 is positioned at the discharge end of the conveyer for receiving pineapples therefrom and for raising them above a receptacle, such as the body of a mobile truck in which the pineapples are to be loaded. This means consists of an elevating conveyer 44 and a flight conveyer 45.

The elevating conveyer involves an endless belt 44a which passes around a pulley 46 mounted on a shaft 47 at the lower end of the conveyer and around a pulley 48 mounted on a shaft 49 at the upper end of the conveyer. At opposite sides of the main conveyer the shaft 47 is mounted in U-shaped bearings 50 which are respectively rigid with and carried by pairs of inwardly converging diagonal or strut members 51 whose opposite ends are secured to the bracket members 35. Bolts 52 or other suitable means are employed for closing the open ends of the U-shaped bearings 50 to removably secure the shaft 47 therein. The elevating conveyer additionally consists of a frame 53 provided with a pair of upwardly diverging members 54 whose upper ends are provided with means 55 pivotally encircling shaft 49 mounted on the frame of the machine.

The elevating conveyer frame 53 is also provided with a pair of substantially parallel upper members 59 disposed above the diverging members 54 as well as above the upper reach of the endless belt 44a, being spaced apart a distance only slightly more than the width of the conveyer belt. Along its bottom the conveyer frame has another pair of substantially parallel members 60 which are disposed slightly below the lower reach of the conveyer belt. The upper and lower parallel members 59 and 60 at each side of the conveyer belt are connected to each other by diagonal members 61, as well as by members 62 which are substantially perpendicular thereto. The parallel members on one side of the conveyer belt may also be connected to the diagonally opposite parallel members on the other side thereof by diagonal rods 63 which extend between the upper and lower reaches of the endless belt. The diverging members 54 of the frame are rigidly connected to each other by transversely extending members 64 and they are also connected to adjacent portions of the upper and lower parallel members 59 and 60 respectively by inwardly diverging members 65. It will thus be seen that a rigid and yet light frame is provided for the elevating conveyer which by virtue of the means 55 encircling shaft 49 is pivotally connected thereto.

The flight conveyer 45 is disposed in spaced substantial parallel lapping relation to the elevating conveyer. It comprises pairs of sprocket wheels or the like 66 and 67 around which endless sprocket chains 68 pass. The lower sprocket wheels 66 are mounted on a shaft 66a carried by bearings 69 secured to the upper portion of the bracket 35 at the inner end of the main conveyer 12. The upper sprockets 67 are mounted on a shaft 70 which is carried in the upper portion of a member 71 whose lower end is secured to and extends at right angles to a sleeve which encircles shaft 66a. Member 71 is supported in the desired position by a slide bearing 72 carried by braces 73 welded or otherwise made rigid with members 59 of the elevating conveyer frame. A turnbuckle 74 preferably forms a part of the member 71 so that the distance between the sprocket wheels 66 and 67 may be adjusted as desired, the slide bearing 72 readily permitting longitudinal movement of member 71. The turnbuckle is preferably adjusted to allow some slack in the sprocket chains 68 so as to permit them to sag downwardly.

Secured to the sprocket chains 68 is an endless belt 75 for cooperating with the pineapples delivered from the main conveyer to the endless belt 44a of the elevating conveyer 44 to raise them without bruising and thereby prevent them from moving or rolling downwardly along the supporting surface of the endless belt in all positions of adjustment. The belt 75 of the flight conveyer is attached to the sprocket chains at a plurality of spaced points so that it will project laterally thereof intermediate its points of attachment to thereby provide flexible portions or folds 76. While some of the pineapples may occupy the spaces between the folds, many of them are engaged by the folds themselves and thus distort the belt. In such cases, the belt exerts sufficient pressure on the pineapples to hold them against the belt 44a to cause them to move therewith. While the shape of the pockets or spaces formed by the projecting portions 76 of the belt, when the belt is at rest, is illustrated in Figure 6, the distance between the folds increases and the folds do not remain upright when the belt is in operation since the forward or leading face of each fold tends to be moved by the pineapples rearwardly away from the trailing portion of the next preceding fold. The reason for this is that when the belt is functioning the forward portions of the folds tend to move rearwardly and relieve the deformation of the belt at its points of connection to the chains while the trailing portions cannot move rearwardly as much since this would effect greater deformation of the belt at its points of attachment.

To secure the belt to the sprocket chains, plate or bar members 77 may be conveniently welded at their opposite ends to the inner faces of the chains and relatively narrow clamping plates 78 may respectively overlie the outer faces of the belt and be removably connected to the plate members 77 by screws 79.

The main and elevating conveyers are supported from the boom 14 by flexible cables or the like 80 and 81. Cable 80 preferably passes over a sheave 82 at the end of the boom and is connected by a yoke 83 to adjacent the outer end of the main conveyer. Cable 81 passes over a sheave 84 carried by the boom adjacent the inner end thereof and the lower end of the cable is connected to a yoke 85 having laterally spaced arms 86 which are respectively provided at their lower ends with circular portions 87 for encircling shaft 47 at the lower end of the elevating conveyer. From sheaves 82 and 84 these cables separately pass over a sheave 88 which is formed with a plurality of peripheral grooves and is mounted on the upper end of an upright support 89 rigidly held in the desired position on the machine frame by diagonal strut members 90 preferably provided with turnbuckles 91. The cables then lead to and are wound on separate winches 92 and 93, respectively, which are independently operable so that the main conveyer may be supported in the desired relation with respect to the ground. It is thus to be seen that the main or collecting conveyer may be tilted upwardly or downwardly by suitable operation of the cable 80 to place it in parallel relation with the terrain of the field being harvested. Moreover, by proper adjustment of the cables 80 and 81, the height of the main conveyer may be adjusted so that it will be a minimum height above the pineapple plants. It is, of course, apparent that adjustment of the inner end of the conveyer by operation of the cable 81 will increase or decrease the degree of inclination of the pineapple elevating means 13, which, as heretofore pointed out, is of such construction that, irrespective of the angle of its inclination, the pineapples will be raised to the desired level.

From the delivery end of the elevating means, the pineapples discharge onto a distributing conveyer 94 from which they are deposited downwardly into the automobile truck body or other suitable receptacle to be loaded. This conveyer consists of a pair of endless belts 95, each of which passes around a pair of pulleys 96 whose axes are preferably substantially vertical. The inner or adjacent reaches of the endless belt 95 jointly form a traveling support for the pineapples in line with the discharge end of the elevating means.

Each one of the conveying devices of the distributing conveyer has a member 97 connecting the pulleys 96 and affording means for maintaining the belt under the desired tension. Each of these members may conveniently consist of a rod-like portion 98 which is made rigid at one end with respect to the inner pulley of the conveying device as hereinafter described and which is threaded at its opposite end to receive a turnbuckle adjusting device 99.

Figure 3:
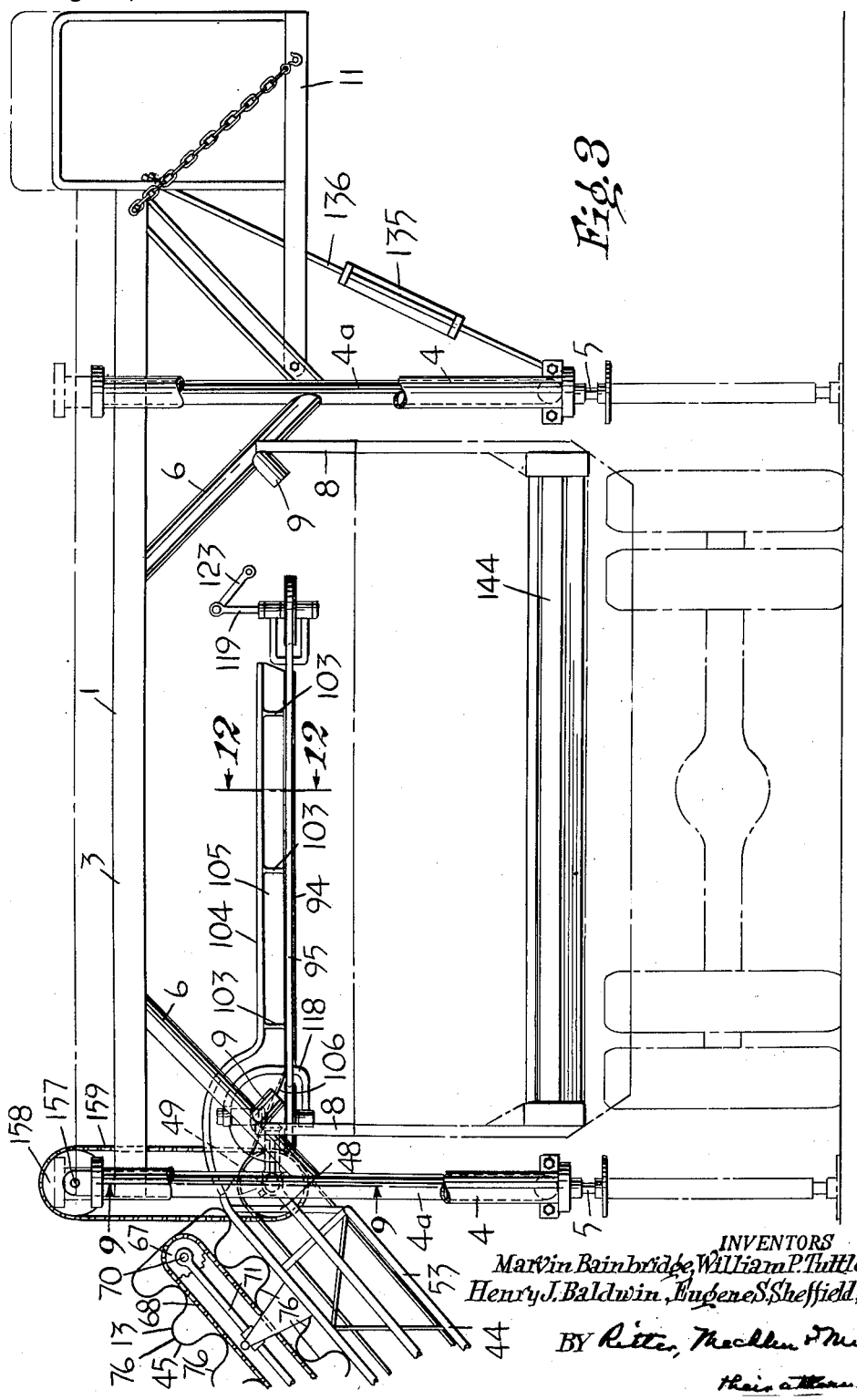
Figure 3 is an enlarged fragmentary view of the inner portion of the harvesting machine with the mobile truck shown in dot and dash lines.

Projecting laterally from opposite sides of the rods 98 of each of the conveying devices are stiffening members 100 for supporting at their outer ends angle shaped members 101 having substantially horizontal flanges 102 on which the belts 95 are supported intermediate the pulleys. Extending upwardly from the rods 98 are a plurality of stiffeners or reinforcements 103 for supporting upper tubular members 104. At their inner ends adjacent the elevating conveyer, these members 104 curve upwardly and downwardly, as indicated in Figure 3 and they are spaced apart a distance only slightly greater than the distance between the upper parallel members 59 of the elevating frame.

The distributing conveyer has side walls 105 of sheet metal which are respectively connected at their upper ends to the tubular members 104 and at their lower ends to the angle members 101. Adjacent the elevating means, the side walls are rigidly connected at their lower ends to provide an inclined floor 106 for supporting the pineapples during their downward passage from the elevating conveying means to the distributing means. The end of the distributing means adjacent the elevating means is pivotally connected to the shaft 49 by brackets 107. Mounted on the shaft between the brackets are bevel gears 108 which respectively mesh with bevel gears 109 secured to the adjacent ends of substantially horizontal shafts 110. These two sets of bevel gears are held in engagement by the brackets 107, each of which is provided with a portion 111 encircling the shaft 110 and with an additional portion 112 encircling the shaft 49.

The shafts 110 are provided at their opposite ends with bevel gears 113 which mesh with bevel gears 114, respectively, rigid with upright shafts 115 on which the sheaves or pulleys 96 at the inner end of each endless conveyer belt 95 are mounted. These upright shafts may be conveniently supported by brackets 116 which are similar to and may be formed integrally with the brackets 107, the upper portion of each of the brackets 116 being formed with a portion 117 which encircles the adjacent upright shaft and the lower portion of the bracket being rigid with the portion 111 of the adjacent bracket 107.

The upper and lower ends of the upright shafts 115 are respectively connected by members 118 which, as may be seen from Figure 9, are respectively bent or curved so as to clear the sheaves 96 at the inner end of the two endless conveyers and, it is to these members that the inner ends of the rod portions 98 of the conveyers are attached. The brackets 116 being integral or rigid with the brackets 107, it will be seen that the axes of the shafts 115 always extend substantially perpendicular to the axis of shaft 49. The upper ends of the shafts 119 on which the sheaves at the discharge end of the distributing conveyer are revolubly mounted are respectively provided with transversely extending members 120 and 121 for receiving a rotatably mounted connecting shaft 122. At one end, shaft 122 extends through and has screw thread connection with member 121 and at the other end where it is provided with a crank 123 it extends through member 120 and is restrained from longitudinal movement with respect thereto. By rotating the shaft 122, the angle between the inner reaches of the two endless belts 95 may be varied to thereby increase or decrease at will the distance between the belts and thus permit pineapples transported by the belts to discharge downwardly between them at any desired point. It will be obvious, therefore, that by regulating the angularity of this space between the belts pineapples delivered to the distributing conveyer may be caused to discharge therefrom at selectively varying points so as to be evenly distributed transversely of the truck body or other receptacle into which they are being loaded.

The outer or free end of the distributing conveyer is preferably connected by a flexible cable 124 or the like which may be hooked at one end to a sleeve or bushing 125 encircling a shaft 126 on which the sheave 88 is mounted. From its hooked end the cable extends downwardly and passes around a pulley or sheave 127 which may be conveniently connected by diverging flexible members 128 to laterally spaced points adjacent the outer end of the distributing conveyer; thence upwardly around the sheave 88 and from there downwardly to a winch 129 which may be operated in any convenient manner to raise or lower the discharge end of the distributing conveyer.

To afford lateral support for the main conveyer 12, a pair of cables 130 are secured to the conveyer, as at 131, adjacent its outer end and diverge inwardly therefrom, passing around sheaves 132 mounted adjacent the ends of members 133 which project from opposite sides of the machine substantial distances beyond the sides of the conveyer. From thence the cables converge inwardly and are connected together so as to pass over a pulley 134 and extend downwardly for joint connection to a weight 135 which is slidably mounted on a pair of inclined rods 136 connected to the machine. Thus any force acting in a substantially horizontal direction tending to displace the main conveyer will be opposed by the force which would be necessary to elevate the weight 135 by one of the cables 130.

As it is desirable to be able to change the vertical angular relationship of the boom 14 with respect to the ground, the boom is preferably pivotally connected to the machine at its inner end, as indicated at 137, and it is adjustably supported at its outer end by a cable 138. One end of this cable is advantageously hooked or otherwise secured to a collar 139 which encircles shaft 126 adjacent one end thereof. From there it passes around a pulley 140 which may be flexibly connected by a cable or the like 141 to the outer end of the boom, thence over a pulley 142 rotatably mounted on shaft 126 and finally to a winch 143 around which it is wound so that the angular position of the boom may be easily controlled.

The bottom or floor of the truck body or other receptacle into which the pineapples drop from the distributing conveyer is preferably formed as a conveyer which may be of any well known or desired form and is movable lengthwise of the truck so that the pineapples dropped therein, from the conveyer and uniformly distributed transversely thereof by suitably operating the adjusting means 122 of the conveyer, may be moved from beneath the distributing conveyer, thus enabling the truck body to be uniformly loaded throughout its length. In the embodiment of the invention here illustrated and described, the distributing conveyer is located adjacent the rear end of the truck body and the conveyer in the floor of the truck is operated to move the pineapples dropped from the distributing conveyer forwardly toward the truck cab.

While any suitable pressure creating mechanism may be employed for actuating the pistons 5 to move them downwardly into engagement with the ground and raise the machine upwardly free of the loaded truck body and to thereafter operate them to lower the machine into operative association with an unloaded truck body, the pressure required can be supplied by a hydraulic pump 145 driven from the engine 10 through a suitable belt 146. A clutch 147 is preferably interposed between the hydraulic pump and the driving belt so that the pump may be thrown out of operation when desired.

The pump is connected to an oil reservoir 148 from which it draws oil through pipe 149 and the fluid under pressure passes from the pump through a line 150 to a series of four-way valves 151 which control the passage of the fluid through pipes 152 to the double acting hydraulic cylinders at the four corners of the frame for moving the pistons in one direction and through pipes 153 for moving the pistons in the opposite direction. When by properly operating the four-way valves pressure is relieved in either of the lines leading to the double acting cylinders, the oil returns to the reservoir 148 through a pipe 154.

Movement is imparted to the various conveyers of the machine from the engine 10 through a shaft 155 which is connected to a speed reducer 156 mounted on the top of the frame. Extending from the speed reducer at right angles to shaft 155 is a shaft 157 on which a sprocket wheel 158 is mounted for driving a sprocket chain 159 passing around a sprocket 160 keyed to shaft 49 whereby rotation is imparted to the shaft. As has been previously explained, the shaft 49 affords a pivotal support for the upper end of the elevating conveyer 44 and the inner end of the distributing conveyer 94 and it is preferably supported at its opposite ends by adjacent ones of the depending members 4a.

Rotation of shaft 49 by the mechanism described causes pulley 48 mounted thereon to revolve and thus drive the endless belt 44a. Movement of the endless belt effects rotation of pulley 46 mounted on shaft 47 at the lower end of the elevating conveyer and this rotation is preferably utilized to transmit motion to belt 21 of the main conveyor and to shaft 70 at the lower end of the flight conveyer 45. A belt 161 driven by pulley 47 and encircling a portion of one of the pulleys or rollers 23 at the inner end of the main conveyer and to one side of the endless belt 21 thereof is employed to transmit movement to that belt. A belt 162 driven from one of these rollers and passing around one of the shafts 70 of the flight conveyer is adequate to transmit the desired rotation to the sprockets 66 which drive the chains 65 to which the belt of the flight conveyer is attached.

Motion is transmitted to the distributing conveyer from shaft 49 through the bevel gears heretofore described.

Figure 4:
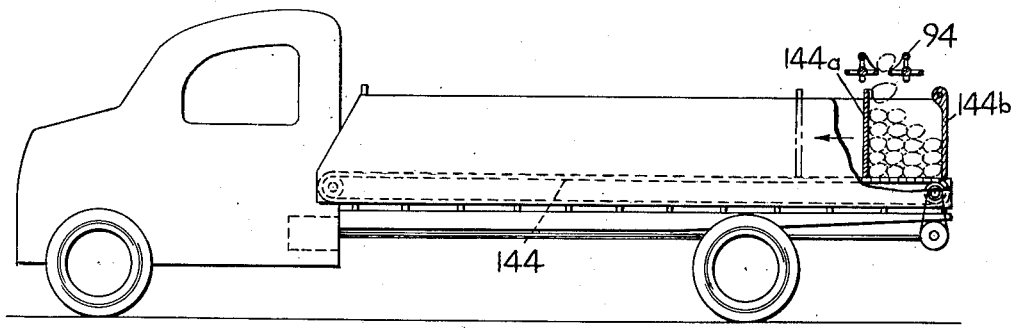
Figure 4 is a side elevational view of the truck into which the pineapples are loaded, the distributing conveyer and the rear portion of the truck being in section.

As previously indicated, the machine is preferably placed on the truck into which the pineapples are loaded so that the distributing conveyer 94 is positioned above the rear end thereof. Before starting the loading operation, the conveyer floor of the truck to which the front end wall 144a of the lading receiving space is preferably attached is actuated to move the wall relatively close to the tail gate 144b of the truck to form an initial relatively small receiving compartment, as shown in Figure 4. When this relatively small compartment is filled with pineapples dropping from the distributing conveyer 94, the front wall 144a is moved with the conveyer floor 144 toward the cab of the truck into approximately the dotted line position indicated in Figure 4 to provide a larger pineapple receiving compartment. When thus moved, the pineapples in the truck settle down and present a depressed upper surface onto which additional fruit is loaded whereby the distance the pineapples drop from the distributing conveyer into the truck is materially reduced and the possibility of bruising the fruit by dropping it directly on the floor of the truck is completely eliminated.

Figure 5:
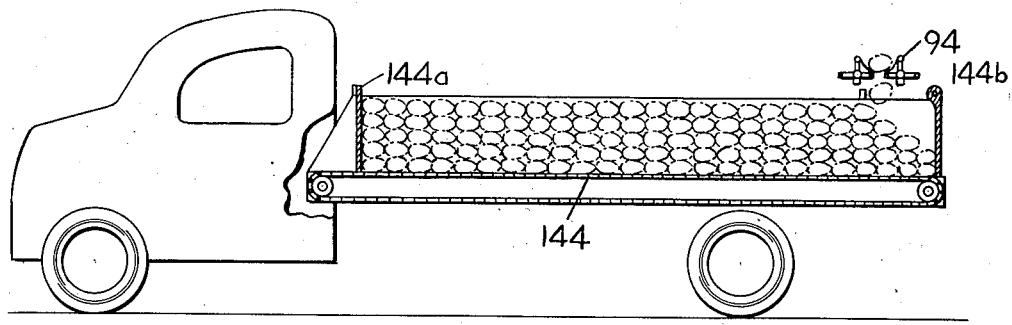
Figure 5 is a view partly in section and partly in elevation of a truck almost completely filled with pineapples with the distributing conveyer also shown in section in the position it occupies when the harvester is carried by the truck.

While the floor conveyer and the attached front wall 144a may, if desired, be continuously moved, these parts are preferably moved intermittently, each time increasing the size of the compartment into which the pineapples are loaded, until the front wall occupies its normal position, as shown in Figure 5, when the entire lading carrying space of the truck will be evenly loaded to a uniform depth. By being able to load the pineapples from a conveyer permitting them to be discharged therefrom at selectively varying points transversely of the truck and by moving the load forwardly of the distributing conveyer by operation of the conveyer floor, it will be appreciated that the truck may be loaded as desired.

After the receptacle into which the pineapples are discharged from the machine is loaded, the pistons 5 are actuated as heretofore described to raise the machine out of engagement with the receptacle and support it in the raised position so that another truck or receptacle to be loaded may be placed beneath it. While being thus supported, a pair of arms 163 may be swung downwardly into engagement with the ground to support the outer end of the main conveyer. These arms which are pivotally connected to the frame of the main conveyer are adapted to be swung upwardly into the inoperative normally upright positions shown in Figure 1.

When the machine is in operation with the main conveyer properly placed over the plants in the field, the truck may move along the roadways bordering the fields being harvested and thereby move the harvesting machine with it. The roadways usually extend in the same general direction as the rows in which the pineapple plants grow so that the conveyer extends over the field at an angle to the road and the fruit pickers, who pick the ripened fruit and place it on the conveyer are enabled to follow the conveyer as it is moved by its supporting truck by walking between the rows of plants. Although the conveyer is intended to be disposed at an elevation which will permit the pickers to easily place the fruit thereon, the side of the conveyer remote from them may be conveniently provided with an upwardly extending member 164 affording a back stop for intercepting pineapples which might be carelessly placed so as to otherwise pass over the conveyer. Occasionally, when a truck is not at hand into which the fruit may be loaded or, in rush harvesting, the pineapples may be severed from their plants and the leafy crowns or tops thereof removed and the pineapples, then placed back on the plants where they will be supported in convenient positions to be subsequently picked up and placed on the conveyer when the machine is used on the field. The normal procedure in using the machine, however, is to place the picked pineapples immediately upon the conveyer either with the tops removed or with the tops left on for subsequent removal at the cannery.

In the form of the invention illustrated in Figures 29 to 32, inclusive, flight and elevating conveyers are shown for raising or elevating the pineapples to a higher elevation than is possible with the flight and elevating conveyers shown in the principal form of the invention.

In this form of the invention, the upper end (not shown) of the elevating conveyer frame 200 is pivotally mounted on the harvesting machine in a manner similar to that shown in the principal form of the invention, and it includes pairs of upper and lower longitudinally extending frame members 201 which may be conveniently connected by members 202, preferably perpendicular to members 201, and by a plurality of diagonal members 203. An endless conveying belt 204 passes around pulleys 205 at opposite ends of the frame 200, the upper pulley 205 being omitted from the drawings but being of substantially the same construction as the lower pulley 205.

Intermediate the pulleys the upper and lower reaches of the endless belt 204 are supported by a plurality of idler rollers, the idler rollers for the upper reach being designated 206 and the ones for the lower reach being designated 207.

The lower pulley of the elevating conveyer 205 is mounted on a shaft 208 which is journaled in substantially U-shaped brackets 209 connected to the frame 210 of the main conveyer by rigid arms 211 which converge inwardly from the discharge end of that conveyer. Thus, like the conveyer frame in the previously described embodiment of the invention, the conveyer frame 200 is pivotally connected to the discharge end of the main conveyer so that, when conditions require, the adjoining ends of the elevating and the main conveyers may be raised or lowered.

Figure 29:
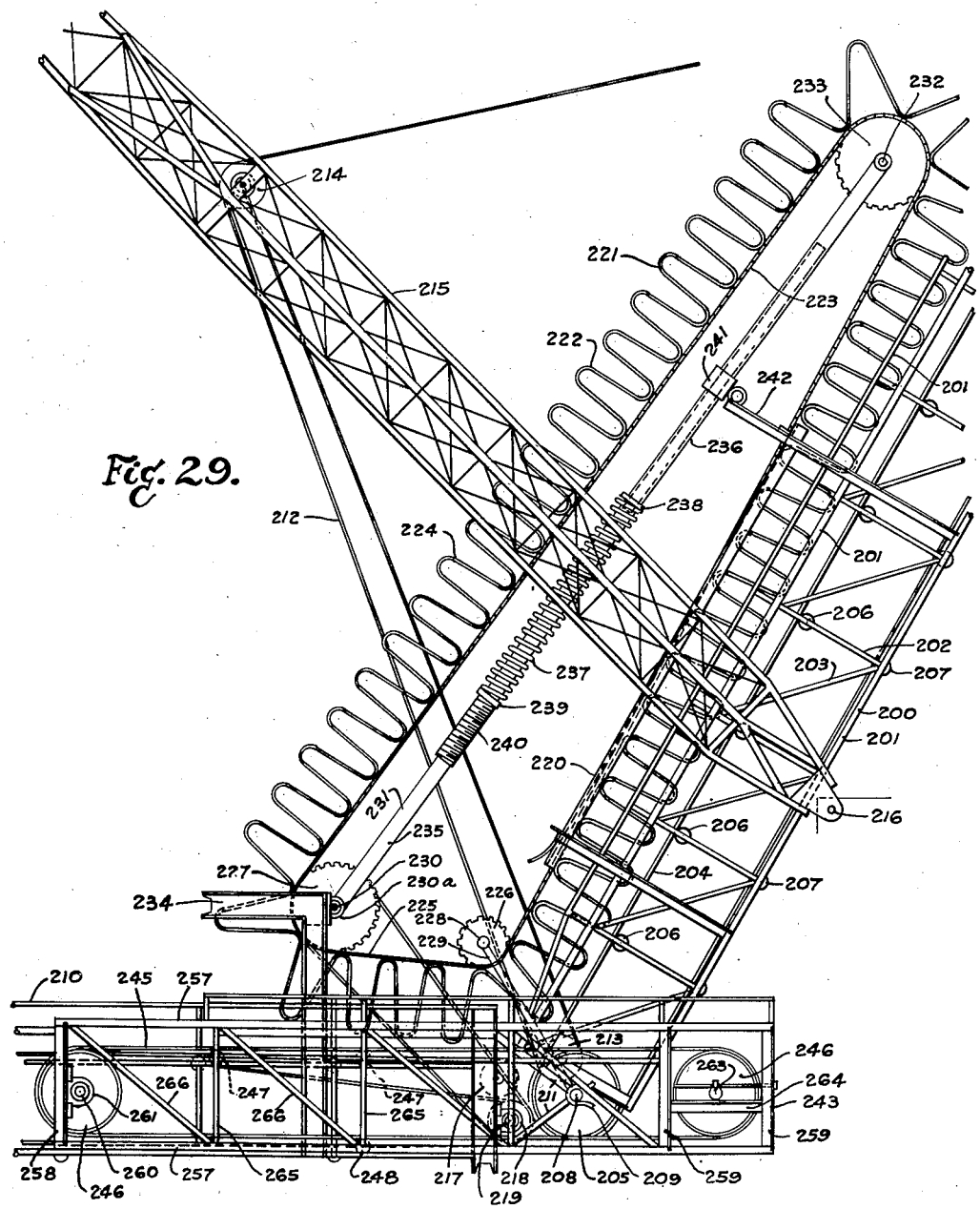
Figure 29 is a side elevational view showing portions of the elevating and flight conveyers together with the discharge end of the main conveyer of a modified form of the invention.
Figure 30:
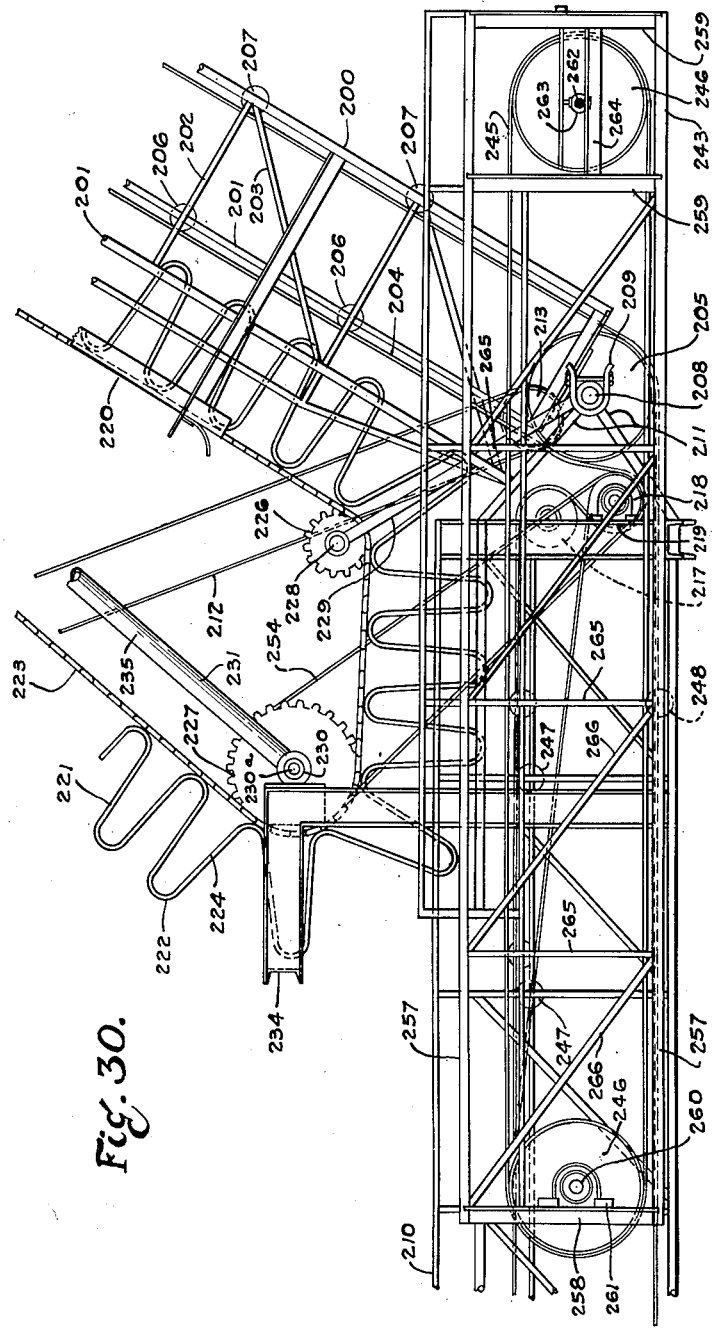
Figure 30 is an enlarged view of the construction illustrated in Figure 29 adjacent the discharge end of the conveyer.

The inner or discharge end of the main conveyer is supported by a pair of cables 212 which are disposed at opposite sides of the conveyer and respectively pass around a pair of sheaves 213 which may be connected by any suitable means to the shaft 208. The ends of the cables (not shown) which lead to the harvesting machine are preferably wound on winces (not shown) and, as shown in Figure 29, the cables are led around sheaves 214 rotatably mounted in a supporting boom 215. From the sheaves 214 the cables, as before indicated, pass around the sheaves 213 and from there extend back toward the sheaves 214 where they are securely anchored to the boom. As in the principal form of the invention, the boom is pivotally mounted upon the harvesting machine, as indicated at 216, so that it may be raised or lowered to vary the angular relationship of the main conveyer to the ground. As cables 212 support the weight of the inner end of the conveyer, they serve also to maintain the elevating conveyer at the desired inclination. It will be appreciated that the angular position of the main conveyer with respect to the ground may be varied by suitable operation of the cables 212.

The endless belt 204 may, if desired, constitute the endless belt for the main conveyer by providing the latter with upper end lower pulleys 217 and 218, respectively. These pulleys may be conveniently mounted at the discharge end of the main conveyer on structural frame members 219 and the upper reach of the belt of the main conveyer passes over the upper side of pulley 217 and then beneath the under side of pulley 218 and from there continues over the upper surface of pulley 205 to form the upper reach of the endless belt of the elevating conveyer. The lower reach of the elevating conveyer passes beneath pulley 205 which is spaced below the lower portion of pulley 218 and from there continues as the lower reach of the main conveyer. Arranged in lapping relation with the endless belt of the elevating conveyer and extending upwardly substantially parallel therewith from the discharge end of the main conveyer is a reach 220 of the flight conveyer 221. The flight conveyer is formed of an endless belt or the like 222 which at its opposite sides are secured to a pair of sprocket chains 223 in a manner similar to that shown in Figures 20 and 21. The securing of the belt to the sprocket chains is such as to provide a plurality of flexible folds 224. The folds are such as to engage and press the pineapples against the belt 204 which are delivered thereto from the main conveyer to cause them to move upwardly therewith, the linear speed of the belt and the flight conveyer being the same.

To enable the transfer of the pineapples with greater ease from the main conveyer 210 to the endless belt 204 of the elevating conveyer 200 and to insure engagement of the flight conveyer 221 with the pineapples as they are transferred from one conveyer to the other, the flight conveyer is preferably provided with a substantially horizontal reach 225. This reach preferably inclines slightly toward the main conveyer so that the folds 224 will be brought into gradual engagement with the pineapples on the main conveyer. Because of this inclination, the folds of the flight conveyer of the horizontal reach 225 thereof, with the possible exception of that fold in the horizontal reach which is first to pass into the reach 220 of the flight conveyer, do not engage the pineapples on the main conveyer with the same force by which they are engaged when on the endless belt 204 of the elevating conveyer.

This substantially horizontal reach of the flight conveyer is formed by providing horizontally spaced sprockets 226 and 227. The sprocket 226 is rotatably mounted upon a shaft 228 carried in circular portions of rod members 229 which at their lower ends are formed so as to encircle shaft 208 of the lower pulley 205 of the elevating conveyer and are thus pivotally connected thereto.

The other sprocket wheels 227 at the lower end of the flight conveyer are mounted on a shaft 230 journaled in bearings 230a carried by brackets 234 secured to opposite sides of the main conveyer. Shaft 230 is journaled in the lower ends of upwardly inclined rods 231 which, at their upper ends, support a shaft 232 carrying sprockets 233 for the upper end of the flight conveyer. The rods 231 are each formed in sections, the lower section 235 of each extending upwardly in telescoping fashion into the complementary upper rod section 236. Sections 235 and 236 are yieldingly held or pressed apart by helical springs 237 which at their upper ends engage flanged lower ends 238 of the upper sections 236 and at their lower ends engage adjustable nuts 239 which are screw threaded on relatively enlarged portions 240 of the lower sections 235. As in the form of the invention first described, the upper portions of rods 231 are slidably supported in sleeves 241 pivotally mounted on the outer ends of brace members 242 rigidly secured to the frame 200 of the elevating conveyer at opposite sides thereof. Thus in addition to the rods being slidably supported at their upper ends, the upper and lower portions thereof are, by virtue of the compression spring 237, held apart a distance to impart the desired tension to the sprocket chains 223.

Since the discharge end of the main conveyer is disposed inwardly of the edge of the field bordering the roadway traversed by the harvesting machine, it is frequently difficult to place the pineapples from plants growing at the edge of the field upon the main conveyer in advance of the elevating conveyer. To overcome this difficulty and make it as easy to harvest fruit from plants growing along the roadway as from plants in the main portion of the field over which the main conveyer extends, an auxiliary conveyer 243 may be provided which, as shown in Figure 31, is spaced to one side of the main conveyer and extends beyond the discharge end thereof. The auxiliary conveyer is conveniently supported by an arm 244 which is rigid with and extends laterally from the frame member 210 of the main conveyer. It consists of an endless belt 245 which at opposite ends pass around pulleys 246. The frame of the auxiliary conveyer may be of a construction similar to that of the frame of the main conveyer and intermediate the pulleys the upper reach of the endless belt of this conveyer is preferably supported by a plurality of rollers 247, while the lower reach thereof may be supported by a single roller 248.

As it is preferable to transfer the pineapples placed on the auxiliary conveyer onto the main conveyer in advance of the flight and elevating conveyers, the upper reach of the endless belt 245 of the auxiliary conveyer moves in a direction opposite to the direction of movement of the upper reach of the main conveyer. This may be accomplished by driving a sprocket 249 rigid with shaft 250, with which the pulley at the inner end of the auxiliary conveyer is also rigid, by a sprocket chain 251 which passes around a sprocket 252 rigid with the shaft with which lower idler pulley 207 of the main conveyer is also rigid. This idler pulley rotates in a direction opposite to the rotation of the upper idler pulley 206 and, since similar motion is imparted to the pulley at the inner end of the auxiliary conveyer by the sprocket chain 251, the belts of the two conveyers are caused to rotate in opposite directions.

On the opposite end of shaft 250 is a sprocket wheel 253 for driving a sprocket chain 254 which passes around one of the sprockets 227 at the lower end of the flight conveyer. Thus the horizontal reach of the flight conveyer is caused to move in the same direction as the upper reach of the endless belt of the main conveyer and the inclined reach of the flight conveyer is also caused to move in the same direction as the upper reach of the endless belt 204 of the elevating conveyer.

At the inner or discharge end of the auxiliary conveyer 243, a transfer plate 255 bridges the space between it and the main conveyer and in addition the auxiliary conveyer is provided with a substantially upright curved deflecting plate 256 so that as the pineapples move in the direction of the arrow shown in Figure 31 on the auxiliary conveyer, they are caused to pass over the transfer plate which may preferably be slightly inclined downwardly toward the endless belt of the main conveyer. Thus the pineapples are delivered to the main conveyer from the auxiliary conveyer in advance of the flight and elevating conveyers and, in order to have the transfer plate 255 inclined downwardly from the auxiliary conveyer to the main conveyer and thereby permit transfer of the pineapples from the former to the latter without bruising, it will, of course, be appreciated, as shown in Figure 32, that the upper reach of the auxiliary conveyer is slightly higher than the upper reach of the main conveyer.

While, as indicated, the structure of the auxiliary conveyer is similar to that of the main conveyer, it should be pointed out that the longitudinally extending rods 257 of the frame of the auxiliary conveyer are connected at one end by upright structural members 258 and at their other ends are connected by pairs of upright members 259. The pulley 246 at the inner or discharge end of the endless belt 245 of the auxiliary conveyer may be conveniently mounted on a shaft 260 journaled in bearings 261 rigidly connected to the uprights 258. At the outer end of the auxiliary conveyer, the shaft 262 on which the pulley 246 is mounted may be conveniently journaled in bearings 263 mounted on cross members 264 which are connected at their opposite ends to the upright pairs of structural members 259.

As with the main conveyer, the longitudinally extending rods 257 of the auxiliary conveyer may be advantageously connected by upright rods 265 as well as by diagonally extending rods 266.

At the right of Figure 32, the lower end of one of the rods 229 is shown with a terminal portion 267 pivotally encircling the shaft on which is mounted the pulley at the discharge end of the main conveyer, and one of the sheaves 213 is likewise shown with a connection 268 which rotatably encircles the shaft.

It will thus be perceived that the modified form of the invention provides a flight conveyer having a portion to come in contact with the pineapples while they are traveling in a more or less horizontal path on the main conveyer so that the pineapples may be easily transferred from the main conveyer to the elevating conveyer. Moreover, in this form of the invention, the auxiliary conveyer enables fruit to be easily placed thereon from plants growing along the side of the road traversed by the harvesting machine and subsequently transferred to the main conveyer in advance of the flight and elevating conveyers.

The embodiment of the invention first described provides a simple method and rugged mechanism which is capable of being removably supported by a mobile truck body into which the pineapples are to be loaded and in both embodiments the main conveying means is adapted to extend in part over the field being harvested. The invention disclosed in the principal embodiment of the invention enables the pineapples to be distributively delivered into the truck body substantially uniformly across its width. It will be observed, moreover, that the conveying mechanism is of such character as not to bruise or otherwise injure the pineapples.

While mechanism embodying the invention is particularly useful for harvesting pineapples, it may be and has been advantageously employed for harvesting other things, such, for example, as pineapple planting material, and therefore the appended claims defining the invention are not to be construed as limited to an apparatus for harvesting pineapples only.

This application is a continuation in part of our application Serial No. 652,004, filed March 5, 1946 and now abandoned.

Various modifications may be made in the details of the structure illustrated and described without departing from the spirit and scope of the invention as defined in the appended claims.

What we claim is:

1. A pineapple harvesting machine adapted to be removably associated with a mobile truck having a body for receiving the pineapples, said machine being adapted to straddle said truck body and having portions engageable therewith for supporting the harvesting machine thereon, conveying mechanism projecting from one side of said frame for delivering pineapples to the truck body including a conveyer extending over a field being harvested, power operating mechanism mounted on the opposite side of said frame having means connected to said conveying mechanism for operating it, and means also carried by the frame for raising it free of said truck body.

2. A pineapple harvesting machine adapted to be associated with a mobile truck having a body for receiving the pineapples, said machine being adapted to straddle said truck body and including a main frame adapted to rest on and be carried by said truck body, conveying mechanism on the frame for delivering pineapples to the truck body having means adapted to extend over a field being harvested, power operating mechanism on the frame for operating said conveying mechanism, and movable means disposed at both ends of the frame engageable with the ground for raising the frame from engagement with the truck body and for supporting the machine in an elevated position to permit the mobile truck to move relatively thereto.

3. A pineapple harvesting machine movable along a roadway bordering the field being harvested, involving a main endless conveyer adapted to extend out over the field being harvested, upwardly inclined means connected to the discharge end of said conveyer for receiving the pineapples therefrom and elevating them with respect thereto, said discharge end of the main conveyer being positioned inwardly of the edge of the field adjacent said roadway, and an auxiliary endless conveyer disposed at one side of said main conveyer and extending to a point adjacent said edge of the field upon which fruit growing adjacent thereto may be placed, said auxiliary conveyer moving in a direction opposite to that of the main conveyer and having a laterally disposed portion for deflecting the fruit placed thereon onto said main conveyer in advance of said upwardly inclined means.

4. A pineapple harvesting machine movable along a roadway bordering the field being harvested, involving a main endless conveyer adapted to extend out over the field being harvested and on which picked pineapples are adapted to be placed for conveyance toward the roadway, upwardly inclined elevating means for receiving the pineapples from the discharge end of said conveyer, said discharge end of the conveyer being disposed inwardly of plants growing along the edge of the field adjacent said roadway, an endless auxiliary conveyer disposed to one side of said main conveyer and extending to a point adjacent said edge of the field on which fruit growing adjacent thereto may be placed, said auxiliary conveyer being adapted to move fruit placed thereon in a direction opposite to the movement of fruit placed on said main conveyer, and means bridging said conveyers whereby the fruit placed on the auxiliary conveyer is caused to discharge onto said main conveyer in advance of said upwardly inclined elevating means.

5. A pineapple harvesting machine movable along the roadway bordering the field being harvested, involving a main endless conveyer adapted to extend out over the field being harvested, upwardly inclined means connected to the discharge end of said conveyer for receiving the pineapples therefrom and elevating them with respect thereto, said discharge end of the main conveyer being positioned inwardly of the edge of the field adjacent said roadway, and an auxiliary endless conveyer disposed at one side of the main conveyer and extending beyond the discharge end thereof to a point adjacent said edge of the field so that fruit growing near said edge may be placed thereon, the upper reach of said auxiliary conveyer being higher than the upper reach of said main conveyer and moving in the opposite direction with respect thereto, and means for causing the fruit placed on said auxiliary conveyer to discharge onto said main conveyer in advance of said upwardly inclined elevating means.

MARVIN BAINBRIDGE.
WILLIAM P. TUTTLE.
HENRY J. BALDWIN.
EUGENE S. SHEFFIELD, Jr.

REFERENCES CITED

The following references are of record in the file of this patent:

UNITED STATES PATENTS

| Number | Name | Date |
|---|---|---|
| 411,993 | Joy | Oct. 1, 1889 |
| 601,578 | Marsh et al. | Mar. 29, 1898 |
| 1,028,823 | Horrell et al. | June 4, 1912 |
| 1,033,291 | Thomas | July 23, 1912 |
| 1,447,316 | Mickelson | Mar. 6, 1923 |
| 1,460,762 | Miller | July 3, 1923 |
| 1,565,622 | Cassie | Dec. 15, 1925 |
| 1,573,728 | Manning | Feb. 16, 1926 |
| 1,613,308 | Bradt | Jan. 4, 1927 |
| 1,969,138 | Kimsey et al. | Aug. 7, 1934 |
| 2,005,442 | Spiegl | June 18, 1935 |
| 2,071,743 | Hartburg | Feb. 23, 1937 |
| 2,169,521 | Chong | Aug. 15, 1939 |
| 2,223,704 | Powell | Dec. 3, 1940 |
| 2,267,234 | Garber | Dec. 23, 1941 |
| 2,321,387 | Jackson | June 8, 1943 |
| 2,357,549 | Roberson | Sept. 5, 1944 |

FOREIGN PATENTS

| Number | Country | Date |
|---|---|---|
| 395,411 | Great Britain | July 17, 1933 |